United States Patent
Huang

(10) Patent No.: US 8,418,930 B2
(45) Date of Patent: Apr. 16, 2013

(54) TEMPERATURE CONTROL CIRCUIT

(75) Inventor: Yong-Zhao Huang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 663 days.

(21) Appl. No.: 12/721,723

(22) Filed: Mar. 11, 2010

(65) Prior Publication Data

US 2011/0094724 A1    Apr. 28, 2011

(30) Foreign Application Priority Data

Oct. 22, 2009    (CN) .......................... 2009 1 0308630

(51) Int. Cl.
*F24F 11/053*    (2006.01)
*G05D 23/19*    (2006.01)
*G05D 23/00*    (2006.01)
*G05B 5/00*    (2006.01)

(52) U.S. Cl.
USPC ........... 236/1 C; 236/78 R; 318/445; 318/471

(58) Field of Classification Search .................. 236/1 C, 236/78 R; 165/201; 318/445, 471
See application file for complete search history.

(56) References Cited

U.S. PATENT DOCUMENTS 3,616,846 A * 11/1971 Wills ............................ 165/256
4,381,480 A * 4/1983 Hara et al. .................... 318/471

* cited by examiner

*Primary Examiner* — Chen Wen Jiang
(74) *Attorney, Agent, or Firm* — Altis Law Group, Inc.

(57) ABSTRACT

The temperature control circuit, to keep a temperature of an enclosed space within a temperature range, comprises a cooling unit to keep the temperature of the enclosed space below a maximum temperature of the temperature range, a heating unit to keep the temperature of the enclosed space above the minimum temperature of the temperature range, and an indicating unit to indicate whether the temperature is within the temperature range.

4 Claims, 1 Drawing Sheet

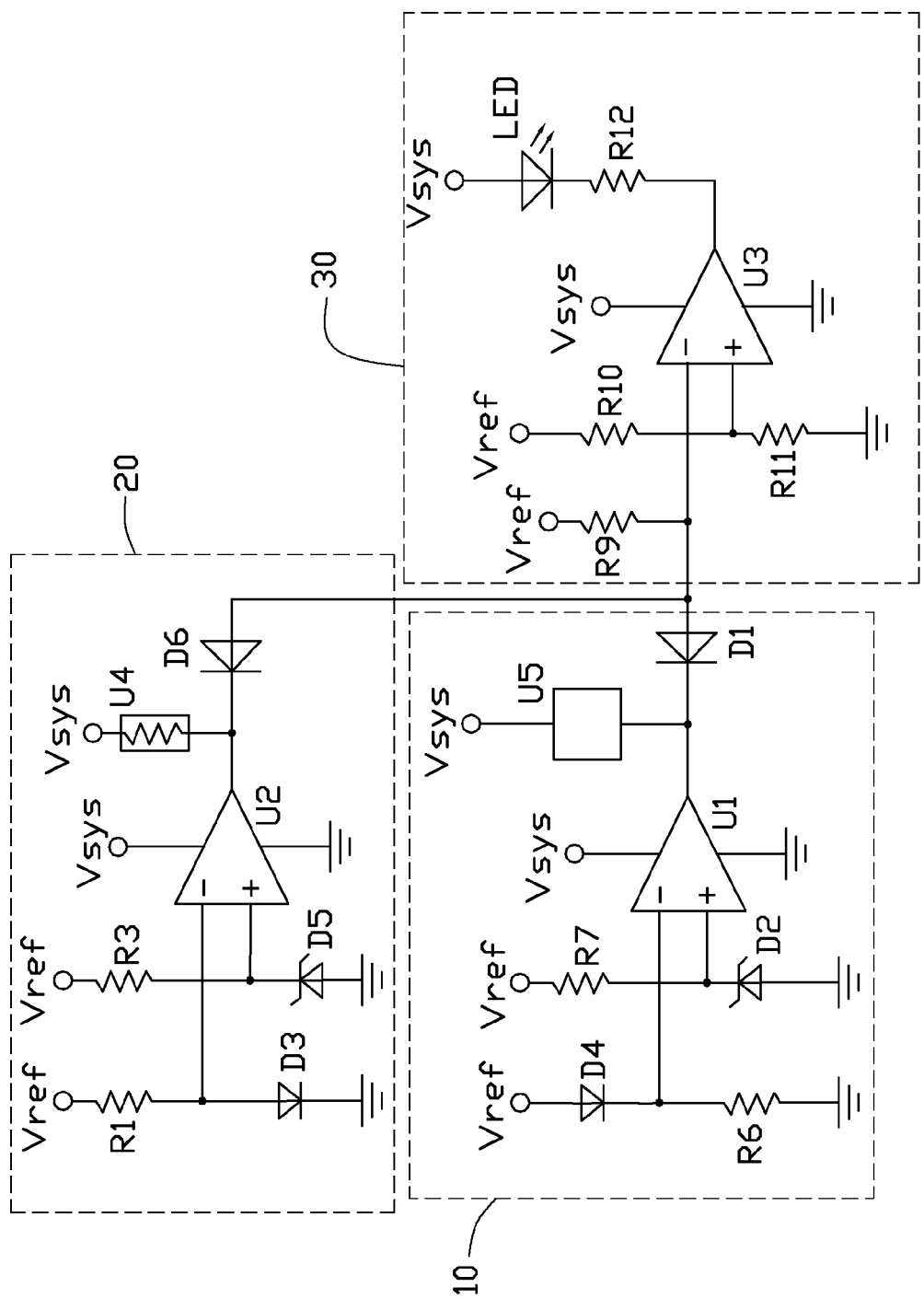

TEMPERATURE CONTROL CIRCUIT

BACKGROUND

1. Technical Field

The present disclosure relates to a temperature control circuit.

2. Description of Related Art

Parameters of electronic devices are measured in an enclosed space, such as in a chamber where the temperature is controlled in a suitable range. In order to meet the requirement, a device is usually also installed in the chamber, such as an air conditioner, but the device is expensive.

BRIEF DESCRIPTION OF THE DRAWING

The drawing is a circuit diagram of one embodiment of a temperature control circuit.

DETAILED DESCRIPTION

Referring to the drawing, one embodiment of a temperature control circuit is applied to control the temperature of an enclosed space within a suitable temperature range, such as [T2, T1], wherein the "T1" is a maximum temperature and the "T2" is a minimum temperature, such that the value of T1 is larger than the value of T2. The temperature control circuit includes a cooling unit 10, a heating unit 20, and an indicating unit 30. The cooling unit 10 and the heating unit 20 connect to the indicating unit 30. The cooling unit 10 controls the temperature of the enclosed space below the maximum temperature T1. The heating unit 20 controls the temperature of the enclosed space above the minimum temperature T2. The indicating unit 30 indicates whether the temperature of the enclosed space is within the suitable temperature range.

The cooling unit 10 includes a first thermal diode D4, a first Zener diode D2, a first comparator U1, a fan U5, a first diode D1, a first resistor R6, and a second resistor R7. The first thermal diode D4 includes an anode connected to a first power supply $V_{ref}$ and a cathode grounded via the first resistor R6. The first Zener diode D2 includes a grounded anode and a cathode connected to the first power supply $V_{ref}$ via the second resistor R7. The first comparator U1 includes an inverting terminal connected to a node between the first thermal diode D4 and the first resistor R6. A non-inverting terminal connects to a node between the first Zener diode D2 and the second resistor R7. An output terminal connects to a first power input terminal of the fan U5 and a cathode of the first diode D1. A positive power terminal connects to a second power supply $V_{sys}$, and a grounded negative power terminal. A second power input terminal of the fan U5 connects to the second power supply $V_{sys}$. An anode of the first diode D1 connects to the indicating unit 30.

The heating unit 20 includes a second thermal diode D3, a second Zener diode D5, a second comparator U2, a heating resistor U4, a second diode D6, a third resistor, and a fourth resistor R3. The second thermal diode D4 includes an anode connected to the first power supply $V_{ref}$ via the third resistor R1 and a grounded cathode. The second Zener diode D5 includes a grounded anode and a cathode connected to the first power supply $V_{ref}$ via the fourth resistor R3. The second comparator U2 includes an inverting terminal connected to a node between the second thermal diode D3 and the third resistor R1, a non-inverting terminal connected to a node between the second Zener diode D5 and the fourth resistor R3, an output terminal connected to a first power input terminal of the heating resistor U4, a positive power terminal connected to the second power supply $V_{sys}$, and a grounded negative power terminal. A second power input terminal of the heating resistor U4 connects to the second power supply $V_{sys}$. An anode of the second diode D2 connects to the indicating unit 30.

The indicating unit 30 includes a third comparator U3 and a light-emitting diode (LED). The third comparator U3 includes an inverting terminal, a non-inverting terminal, an output terminal, a positive power terminal, a negative power terminal. The inverting terminal connects to the first power supply $V_{ref}$ via a fifth resistor R9, and connects to the anodes of the first and second diodes D1 and D6. The non-inverting terminal connects to the first power supply $V_{ref}$ via a sixth resistor R10, and to ground via a seventh resistor R11. The output terminal of the third comparator U3 connects to a cathode of the LED via an eighth resistor R12. The positive power terminal connects to the second power supply $V_{sys}$. The negative power terminal is grounded. An anode of the LED connects to the second power supply $V_{sys}$.

The first and second thermal diodes D4 and D3 are silicon thermal diodes. A turn-on voltage drop of each of the first and second thermal diodes D4 and D3 changing with the temperature, is expressed below.

$$U_d = (0.65 - 0.2*10^{-3}*\Delta T)V,$$

wherein, the number 0.65 is a turn-on voltage drop of the silicon thermal diode at a normal temperature, such as 27° C.; the number $0.2*10^{-3}$ denotes that the turn-on voltage drop of the silicon thermal diode decreases $0.2*10^{-3}$ when the temperature increases every one degree; the parameter $\Delta T$ expresses a variable value of the temperature of the enclosed space. A threshold value of the first Zener diode D2 is larger than a threshold value of the second Zener diode D5.

When the temperature T of the enclosed space is within the temperature range [T2, T1], a voltage at the cathode of the second Zener diode D5 is greater than a voltage at the anode of the second thermal diode D3. Namely, the voltage at the non-inverting terminal of the second comparator U2 is greater than the voltage at the inverting terminal of the second comparator U2, the output terminal of the second comparator U2 outputs a high voltage. The second diode D6 is turned off, and the heating resistor U4 is idle. The cathode of the first Zener diode D2 is at a higher voltage level than the cathode of the first thermal diode D4, namely, the non-inverting terminal of the first comparator U1 has a higher voltage than the inverting terminal of the first comparator U1, and the output terminal of the first comparator U1 outputs a high voltage. The first diode D1 is turned off, and the fan U4 is idle. At this time, a voltage at the inverting terminal of the third comparator U3 is larger than the voltage at the non-inverting terminal of the third comparator U3. Therefore, the output terminal of the third comparator U3 outputs low voltage to the cathode of the LED, and the anode of the LED is at a high voltage level, thereby the LED is turned on and emits light, which indicates that the temperature of the enclosed space is normal.

As the temperature rises, the turn-on voltage drops of the first and second thermal diodes D4 and D3 decrease. When the temperature of the enclosed space exceeds the maximum temperature T1, a voltage at the cathode of the second Zener diode D5 is greater than a voltage at the anode of the second thermal diode D3. Namely, a voltage at the non-inverting terminal of the second comparator U2 is greater than a voltage at the inverting terminal of the second comparator U2, the output terminal of the second comparator U2 is at a high voltage level. The second diode D6 is turned off, the heating resistor U4 is idle. The cathode of the first Zener diode D2 is at a lower voltage level than the cathode of the first thermal diode D4, namely, the non-inverting terminal of the first comparator U1 has a lower voltage than the inverting terminal of the first comparator U1, and the output terminal of the first comparator U1 outputs a low voltage. The fan U5 is operating and the first diode D1 is turned on. At this time, a voltage at the inverting terminal of the third comparator U3 is lower than the non-inverting terminal of the third comparator U3. Therefore, the output terminal of the third comparator U3 outputs a high voltage to the cathode of the LED, so the LED is turned off, which indicates that the temperature of the enclosed space is abnormal.

As the temperature decreases, the turn-on voltage drops from the first and second diodes D4 and D3 increases. When the temperature of the enclosed space is lower than the minimum temperature T2, the anode of the second thermal diode D3 has a higher voltage than the cathode of the second Zener diode D5, namely, the inverting terminal of the second comparator U2 has a higher voltage than the non-inverting terminal of the second comparator U2. The output terminal of the second comparator U2 outputs a low voltage. The second diode D6 is turned on, and the heating resistor U4 is turned on. The cathode of the first thermal diode D4 has a lower voltage than the cathode of the first Zener diode D2, namely, the inverting terminal is at a lower voltage level than the non-inverting terminal of the first comparator U1, and the output terminal of the first comparator U1 outputs a high voltage. The first diode D1 is turned off, and the fan U5 is idle. At this time, a voltage at the inverting terminal of the third comparator U3 is lower than the non-inverting terminal of the third comparator U3. Therefore, the output terminal of the third comparator U3 outputs a high voltage, so the LED turns off, which indicates that the temperature of the enclosed space is abnormal.

In one embodiment, the maximum temperature T1 and minimum temperature T2 are able to be regulated, respectively by replacing the first and second thermal diodes D2 and D5 by other thermal diodes with different threshold values. If the threshold value of the first thermal diode D2 becomes larger, the maximum temperature T1 will increase, otherwise the maximum temperature T1 will decrease. If the threshold value of the second thermal diode D5 becomes larger, the minimum temperature T1 will decrease, otherwise the minimum temperature T1 will increase.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A temperature control circuit, comprising:
   a cooling unit comprising a first thermal diode, a first Zener diode, a first comparator, a cooling element, a first resistor, and a second resistor; and
   a heating unit comprising a second thermal diode, a second Zener diode, a second comparator, a heater, a third resistor, and a fourth resistor, wherein an anode of the first thermal diode is connected to a first power supply, and a cathode of the first thermal diode is grounded via the first resistor; an anode of the first Zener diode is grounded, and a cathode of the Zener diode is connected to the first power supply via the second resistor; an inverting terminal of the first comparator is connected to a node between the first thermal diode and the first resistor, and a non-inverting terminal of the first comparator is connected to a node between the first Zener diode and the second resistor; the cooling element comprises a first power input terminal connected to an output terminal of the first comparator, and a second power input terminal connected to a second power supply; an anode of the second thermal diode is connected to the first power supply via the third resistor, and a cathode of the second thermal diode is grounded; an anode of the second Zener diode is grounded, and a cathode of the second Zener diode is connected to the first power supply via the fourth resistor; an inverting terminal of the second comparator is connected to a node between the second thermal diode and the third resistor, and a non-inverting terminal of the second comparator is connected to a node between the second Zener diode and the fourth resistor; the heater comprising a first power input terminal connected to an output terminal of the second comparator, and a second power input terminal connected to the second power supply.

2. The temperature control circuit of claim 1, further comprising an indicating unit, comprising:
   a third comparator comprising an inverting terminal connected to the first power supply via a fifth resistor, a non-inverting terminal connected to the first power supply via a sixth resistor and grounded via a seventh resistor, and an output terminal; and
   a light-emitting diode comprising a cathode connected to the output terminal of the third comparator via an eighth resistor, and an anode connected to the second power supply;
   wherein the cooling unit further comprises a first diode comprising a cathode connected to the output terminal of the first comparator, and an anode connected to the inverting terminal of the third comparator; the heating unit further comprises a second diode comprising a cathode connected to the output terminal of the second comparator, and an anode connected to the inverting terminal of the third comparator.

3. The temperature control circuit of claim 2, wherein the heater is a heating resistor.

4. The temperature control circuit of claim 2, wherein the cooling element is a fan.

* * * * *